United States Patent
Suzuki et al.

(10) Patent No.: US 9,440,653 B2
(45) Date of Patent: Sep. 13, 2016

(54) DRIVE CONTROL DEVICE FOR VEHICLE

(71) Applicants: Takeaki Suzuki, Susono (JP); Masaki Matsunaga, Odawara (JP); Yasunari Kido, Hadano (JP); Takayuki Kogure, Susono (JP); Yukari Okamura, Gotenba (JP); Rentaro Kuroki, Susono (JP); Takuya Hirai, Susono (JP); Masaki Mitsuyasu, Kawasaki (JP); Jonggap Kim, Hadano (JP); Akihiro Sato, Nagoya (JP); Yusuke Kinoshita, Toyota (JP)

(72) Inventors: Takeaki Suzuki, Susono (JP); Masaki Matsunaga, Odawara (JP); Yasunari Kido, Hadano (JP); Takayuki Kogure, Susono (JP); Yukari Okamura, Gotenba (JP); Rentaro Kuroki, Susono (JP); Takuya Hirai, Susono (JP); Masaki Mitsuyasu, Kawasaki (JP); Jonggap Kim, Hadano (JP); Akihiro Sato, Nagoya (JP); Yusuke Kinoshita, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 71 days.

(21) Appl. No.: 14/413,492

(22) PCT Filed: Oct. 15, 2013

(86) PCT No.: PCT/IB2013/002297
§ 371 (c)(1),
(2) Date: Jan. 8, 2015

(87) PCT Pub. No.: WO2014/060823
PCT Pub. Date: Apr. 24, 2014

(65) Prior Publication Data
US 2015/0151761 A1 Jun. 4, 2015

(30) Foreign Application Priority Data

Oct. 19, 2012 (JP) .................. 2012-232309

(51) Int. Cl.
*B60W 30/18* (2012.01)
*B60W 10/02* (2006.01)
*B60W 10/06* (2006.01)

(52) U.S. Cl.
CPC ........ *B60W 30/18072* (2013.01); *B60W 10/02* (2013.01); *B60W 10/06* (2013.01); *B60W 2030/1809* (2013.01); *B60W 2550/142* (2013.01); *B60W 2710/021* (2013.01)

(58) Field of Classification Search
None
See application file for complete search history.

(56) References Cited

U.S. PATENT DOCUMENTS

| 4,842,113 A * | 6/1989 | Lutz ..................... | B60W 10/06 477/73 |
|---|---|---|---|
| 7,935,024 B2 * | 5/2011 | Winkel ................. | B60W 10/02 477/185 |
| 9,045,130 B2 * | 6/2015 | Sano ...................... | F02D 29/02 |

FOREIGN PATENT DOCUMENTS

| JP | 2002-227885 | 8/2002 |
|---|---|---|
| JP | 2006-312982 | 11/2006 |
| JP | 2009-264513 | 11/2009 |
| JP | 2014-83895 | 5/2014 |
| WO | WO 2014/060825 A1 | 4/2014 |

* cited by examiner

*Primary Examiner* — Ramya Burgess
*Assistant Examiner* — David Morris
(74) *Attorney, Agent, or Firm* — Finnegan, Henderson, Farabow, Garrett & Dunner, LLP (57) ABSTRACT

A drive control device for a vehicle including an engine and a clutch device provided in a power transmission path between the engine and a drive wheel includes: a normal traveling unit causing the vehicle to travel while the engine is connected to the drive wheel; a free-run coasting unit disconnecting the engine from the drive wheel during traveling and causing the vehicle to coast while the engine is stopped; a neutral coasting unit disconnecting the engine from the drive wheel during traveling and causing the vehicle to coast while the engine is autonomously operated; and a coasting switching control unit setting an upper limit value of an upward gradient of a road surface, at which the neutral coasting is stopped, such that the upper limit value is larger than an upper limit value of the upward gradient of the road surface, at which the free-run coasting is stopped.

4 Claims, 4 Drawing Sheets

| DRIVE MODE | ENGINE 12 | CLUTCH C1 | ENGINE BRAKING FORCE | NEGATIVE PRESSURE SUPPLY |
|---|---|---|---|---|
| ENGINE BRAKING TRAVELING | DRIVEN FOR ROTATION | ENGAGED | LARGE | SUPPLIED |
| FREE-RUN COASTING | F/C, ROTATION IS STOPPED | RELEASED | SMALL | NOT SUPPLIED |
| NEUTRAL COASTING | OPERATED AT IDLE | RELEASED | SMALL | SUPPLIED |

DRIVE CONTROL DEVICE FOR VEHICLE

CROSS-REFERENCE TO RELATED APPLICATIONS

This application is a national phase application of International Application No. PCT/IB2013/002297, filed Oct. 15, 2013, and claims the priority of Japanese Application No. 2012-232309, filed Oct. 19, 2012, the content of both of which is incorporated herein by reference.

BACKGROUND OF THE INVENTION

1. Field of the Invention

The invention relates to a drive control device for a vehicle and, more particularly, to a technique for, in the vehicle that is able to travel in coasting, that is, in a state where engine braking force is decreased as compared to that in engine braking traveling, achieving both fuel economy and drivability of the vehicle during coasting on an upward-gradient road surface.

2. Description of Related Art

There is engine braking traveling in which a vehicle travels while engine braking is being applied through driven rotation of an engine in a state where a power transmission path between the engine and drive wheels remains connected. In contrast to this, there is conceivably coasting in which a vehicle travels while engine braking force is decreased as compared to that in the engine braking traveling in order to contribute to improvement in fuel economy by extending a travel distance. One example is a device described in Japanese Patent Application Publication No. 2002-227885 (JP 2002-227885 A). The device is configured to, when it is determined that an accelerator pedal has been returned while the vehicle is traveling, the vehicle is caused to start coasting by releasing a clutch provided in a power transmission path between an engine and drive wheels. Thus, the fuel economy of the vehicle is improved.

When the vehicle is coasting on an upward-gradient road surface, a vehicle speed easily decreases and the need for re-acceleration increases as compared to when the vehicle is coasting on a flat road or a downward-gradient road surface. Incidentally, the coasting of the vehicle conceivably includes free-run coasting in which the engine is disconnected from the drive wheels by releasing the clutch in the power transmission path and rotation of the engine is stopped by stopping supply of fuel to the engine. The coasting of the vehicle conceivably also includes neutral coasting in which the engine is operated by being supplied with fuel in a state where the engine is disconnected from the drive wheels by releasing the clutch in the power transmission path. These coastings differ from each other as follows in control at the time of returning to normal traveling. The engine is stopped in the free-run coasting, so it is required to restart the engine at the time of returning to the normal traveling and then to engage the clutch. On the other hand, the engine is rotating in the neutral coasting, so it is just required to engage the clutch at the time of returning to the normal traveling.

However, JP 2002-227885 A does not consider how a stop condition based on an upward gradient of a road surface is set for each of the free-run coasting and the neutral coasting. Therefore, it is not possible to appropriately stop coasting on the basis of the upward gradient of the road surface, and there may occur the following inconvenience. That is, if a relatively large gradient is set as an upper limit value of the upward gradient of the road surface at which coasting is stopped, when the vehicle is travelling in the free-run coasting at a place where the upward gradient of the road surface is relatively large and the likelihood of re-acceleration is high, the engine is started at the time of returning from the coasting to the normal traveling because the engine is stopped. Therefore, the response of re-acceleration deteriorates as compared to when the vehicle travels in the neutral coasting. On the other hand, if a relatively small gradient is set as the upper limit value of the upward gradient of the road surface at which the coasting is stopped, when the vehicle is traveling in the neutral coasting at a place where the upward gradient of the road surface is relatively small and the likelihood of re-acceleration is low, there is inconvenience that the fuel economy of the vehicle deteriorates because the engine remains operated.

SUMMARY OF THE INVENTION

The invention provides a drive control device for a vehicle, which achieves both improvement in the fuel economy of the vehicle and improvement in the response of re-acceleration of the vehicle when the vehicle coasts on an upward-gradient road surface.

A first aspect of the invention provides a drive control device for a vehicle. The drive control device includes: a normal traveling unit configured to execute normal traveling in which the vehicle travels in a state where the engine is connected to the drive wheel;, a free-run coasting unit configured to execute free-run coasting in which the engine is disconnected from the drive wheel during traveling and the vehicle coasts while the engine is stopped; a neutral coasting unit configured to execute neutral coasting in which the engine is disconnected from the drive wheel during traveling and the vehicle coasts while the engine is autonomously operated; and a coasting switching control unit configured to set an upper limit value of an upward gradient of a road surface, at which the neutral coasting is stopped, such that the upper limit value of the upward gradient of the road surface, at which neutral coasting is stopped, is larger than an upper limit value of the upward gradient of the road surface, at which the free-run coasting is stopped.

With the drive control device according to the above first aspect, the upper limit value of the upward gradient of the road surface, at which the neutral coasting is stopped, is set so as to be larger than the upper limit value of the upward gradient of the road surface, at which the, free-run coasting is stopped. Therefore, the vehicle is caused to travel in the neutral coasting at a place where the upward gradient of the road surface is relatively large and the need for re-acceleration at the time of returning from the coasting is large, so the response of re-acceleration at the time of the returning improves. At a place where the upward gradient of the road surface is relatively small, the free-run coasting is allowed to be executed, so it is possible to execute the coasting having high fuel economy. Thus, it is possible to achieve both improvement in the fuel economy of the vehicle and improvement in the response of re-acceleration of the vehicle when the vehicle coasts on an upward-gradient road surface.

In the drive control device according to the above first aspect, the coasting switching control unit may be configured to stop the free-run coasting and to start the normal traveling when the upward gradient of the road surface becomes larger than the upper limit value of the upward gradient of the road surface, at which the free-run coasting is stopped, during the free-run coasting, and the coasting switching control unit may be configured to stop the neutral coasting and to start the normal traveling when the upward gradient of the road surface becomes larger than the upper limit value of the upward gradient of the road surface, at which the neutral coasting is stopped, during the neutral coasting. Thus, the response of re-acceleration when the vehicle coasts on an upward-gradient road surface favorably improves.

In the drive control device according to the above first aspect, the coasting switching control unit may be configured to stop the free-run coasting and to start the neutral coasting when the upward gradient of the road surface becomes larger than the upper limit value of the upward gradient of the road surface, at which the free-run coasting is stopped, during the free-run coasting, and the coasting switching control unit may be configured to stop the neutral coasting and to start the normal traveling when the upward gradient of the road surface becomes larger than the upper limit value of the upward gradient of the road surface, at which the neutral coasting is stopped, during the neutral coasting. Therefore, for example, in comparison with the configuration that the free-run coasting is stopped and the normal traveling is started when the upward gradient becomes larger than the upper limit value of the upward gradient, at which the free-run coasting is stopped, the power transmission path between the engine and the drive wheel is disconnected when the upward gradient falls between the upper limit value of the upward gradient, at which the free-run coasting is stopped, and the upper limit value of the upward gradient, at which the neutral coasting is stopped, so the fuel economy of the vehicle when the vehicle coasts on an upward-gradient road surface favorably improves.

In the drive control device according to the above first aspect, the coasting switching control unit may be configured to select the free-run coasting when the upward gradient of the road surface is smaller than the upper limit value of the upward gradient of the road surface, at which the free-run coasting is stopped. Therefore, at a place where the upward gradient of the road surface is relatively small and there is a low likelihood of re-acceleration, the free-run coasting is selected, so it is possible to execute the coasting having high fuel economy.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Figure 1:
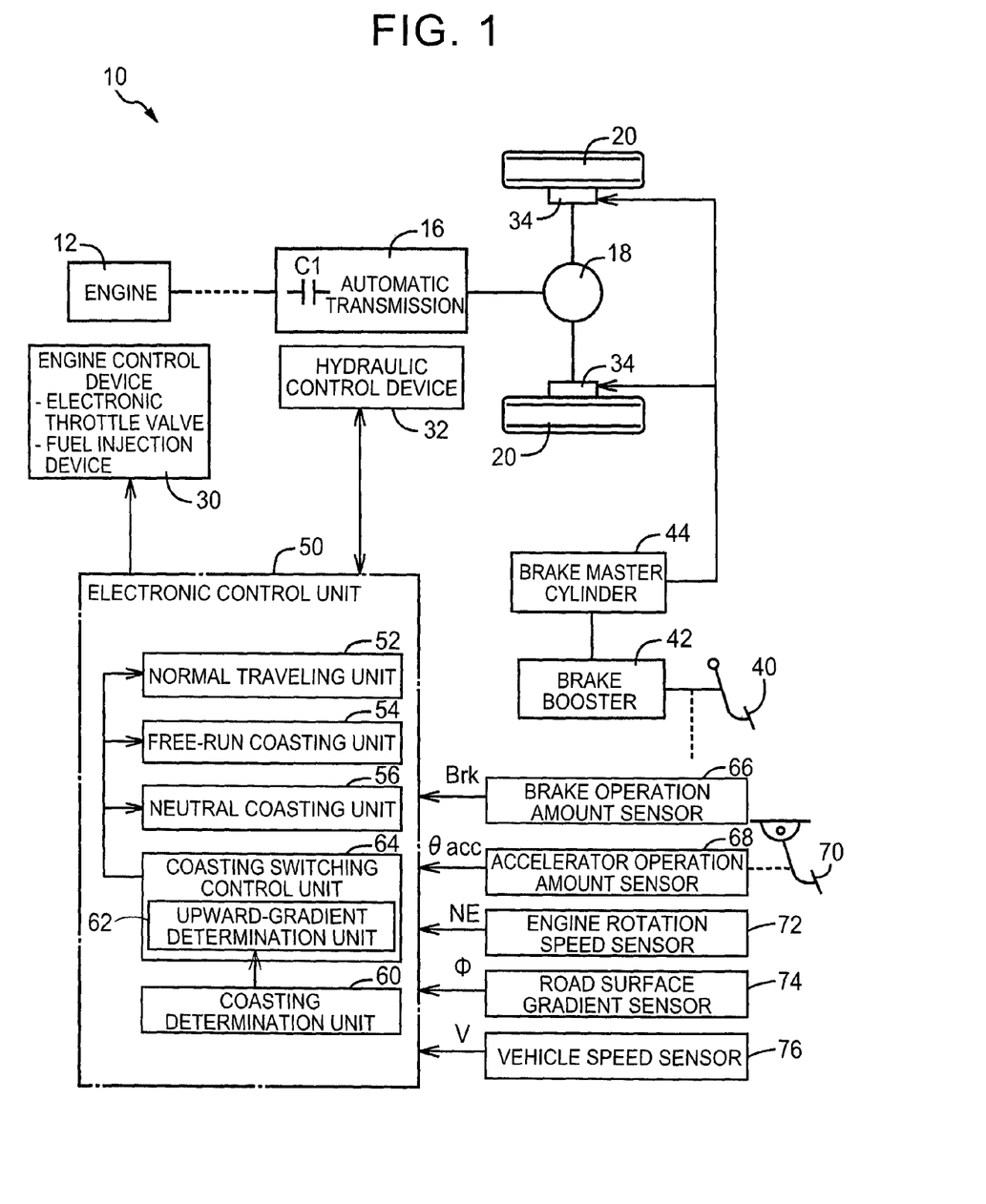
FIG. 1 is a schematic configuration view that shows a skeletal view of a vehicle drive device according to an embodiment together with a relevant portion of control functions of an electronic control unit.

FIG. 1 is a schematic configuration view that shows a vehicle drive device 10 to which the embodiment of the invention is suitably applied together with a relevant portion of control functions of an electronic control unit 50 that may be regarded as a drive control device of the vehicle drive device 10. The vehicle drive device 10 includes an engine 12 as a driving force source. The engine 12 is an internal combustion engine, such as a gasoline engine and a diesel engine. The output of the engine 12 is transmitted from an automatic transmission 16 to right and left drive wheels 20 via a differential gear unit 18. A damper device and a power transmission device, such as a torque converter, are provided between the engine 12 and the automatic transmission 16. A motor generator that functions as a driving force source may be arranged between the engine 12 and the automatic transmission 16.

The engine 12 includes an engine control device 30 having various devices, such as an electronic throttle valve and a fuel injection device, required to control the output of the engine 12. The electronic throttle valve is used to control an intake air amount. The electronic throttle valve is basically controlled on the basis of an operation amount of an accelerator pedal 70, that is, an accelerator operation amount $\theta acc$, which is a driver's output request amount. The fuel injection device is used to control the amount of fuel supplied. The fuel injection device is able to stop supply of fuel (fuel cut (F/C)), for example, when the accelerator is off, that is, the accelerator operation amount $\theta acc$ is 0, even while the vehicle is travelling.

The automatic transmission 16 is, for example, a step-shift automatic transmission, such as a planetary gear type, in which a plurality of gear positions having different speed ratios e are established by engaged/released states of a plurality of hydraulic friction engagement devices (clutches and brakes). Shift control over the automatic transmission 16 is carried out by electromagnetic hydraulic control valves, selector valves, and the like, provided in a hydraulic control device 32. A clutch (clutch device) C1 functions as an input clutch of the automatic transmission 16, and similarly undergoes engaging/releasing control by the hydraulic control device 32. The clutch C1 may be regarded as a separating clutch that connects or disconnects a power transmission path between the engine 12 and the drive wheels 20. In addition, a parallel-shaft constant-mesh step-shift transmission or a continuously variable transmission, such as a belt type, with a forward/reverse switching gear mechanism may be used as the automatic transmission 16.

In the case of the parallel-shaft constant-mesh step-shift transmission, the power transmission path is released by disengaging meshing of the synchromeshes with the use of corresponding actuators. In the case of the continuously variable transmission, the power transmission path is released by releasing forward and reverse traveling friction engagement devices provided in the forward/reverse switching gear mechanism.

A wheel brake 34 is provided at each of the drive wheels 20. The wheel brakes 34 generate braking force on the basis of brake operation force (depression force) Brk of a brake pedal 40 that is operated by a driver. The brake operation force Brk serves as a brake request amount. In the present embodiment, brake hydraulic pressure is mechanically generated from a brake master cylinder 44 via a brake booster 42 on the basis of the brake operation force Brk, and braking force is generated by the brake hydraulic pressure. The brake booster 42 amplifies the brake operation force Brk by utilizing negative pressure that is generated by the rotation of the engine 12. Brake hydraulic pressure that is output from the brake master cylinder 44 is amplified by the brake booster 42, so large braking force is obtained. The brake pedal 40 functions as a brake operation member.

The thus configured vehicle drive device 10 includes an electronic control unit 50. The electronic control unit 50 includes a so-called microcomputer that includes a CPU, a ROM, a RAM, an input/output interface, and the like, and executes signal processing in accordance with programs prestored in the ROM while utilizing a temporary storage function of the RAM. A brake operation amount sensor 66 detects a signal that indicates a brake operation force Brk (kPa). An accelerator operation amount sensor 68 detects a signal that indicates the accelerator operation amount θacc (%) that is the operation amount of the accelerator pedal 70. An engine rotation speed sensor 72 detects a signal that indicates a rotation speed NE (rpm) of the engine 12. A road surface gradient sensor 74 detects a signal that indicates an upward gradient (gradient) Φ (angle) of a road surface R. A vehicle speed sensor 76 detects a signal that indicates a vehicle speed V (km/h). The signal that indicates the brake operation force Brk (kPa), the signal that indicates the accelerator operation amount θacc (%), the signal that indicates the rotation speed NE (rpm) of the engine 12, the signal that indicates the upward gradient (gradient) Φ (angle) of the road surface R and the signal that indicates the vehicle speed V (km/h) are supplied to the electronic control unit 50. Other than the above, various pieces of information required for various controls are supplied.

The electronic control unit 50 executes output control and rotation stop control over the engine 12 on the basis of the accelerator operation amount θacc, the brake operation amount, and the like, corresponding to a driver's intention to accelerate. The electronic control unit 50 executes, for example, shift control for controlling the gear position of the automatic transmission 16 on the basis of a required output based on the accelerator operation amount θacc corresponding to a driver's intention to accelerate or on the basis of the accelerator operation amount θacc and the vehicle speed V by consulting a prestored shift line map. The automatic transmission 16 is configured to merely establish a predetermined gear position on the basis of the vehicle speed V, and the like, in a coasting state where the accelerator operation amount θacc is zero, and the clutch C1 is kept in an engaged state. In this engine braking traveling, the engine 12 is driven at a predetermined rotation speed that is determined on the basis of the vehicle speed V and the speed ratio e, and, engine braking force corresponding to the rotation speed is generated. In addition, the engine 12 is driven at the predetermined rotation speed, so the amplification action of the brake booster 42 for amplifying the brake operation force Brk by utilizing negative pressure generated through the engine rotation is appropriately obtained, and controllability of braking force through brake operation is sufficiently obtained.

Figure 2:
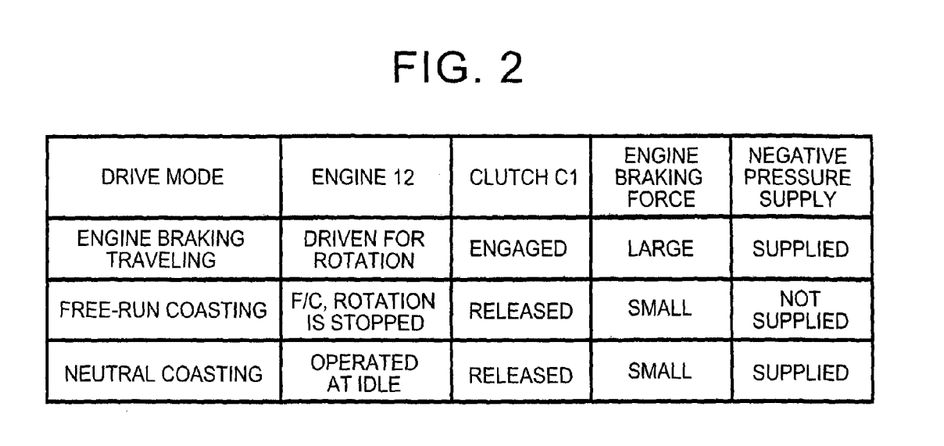
FIG. 2 is a view that illustrates three types of coastings that are executed by the vehicle drive device according to the embodiment.

The electronic control unit 50 further includes a normal traveling unit 52, a free-run coasting unit 54, a neutral coasting unit 56, a coasting determination unit 60, a coasting switching control unit 64, and the like. The coasting switching control unit 64 includes an upward-gradient determination unit 62. The normal traveling unit 52 executes normal traveling in which the vehicle travels while the power transmission path between the engine 12 and the drive wheels 20 is connected by engaging the clutch C1. The normal traveling unit 52 executes acceleration traveling in which the vehicle is accelerated through driving rotation of the engine 12 when the accelerator, is on. When the accelerator is off, the normal traveling unit 52 executes engine braking traveling in which engine braking is generated due to pumping loss, friction torque, and the like, through driven rotation of the engine 12 as shown in FIG. 2. In the engine braking traveling, the engine 12 may be placed in a fuel cut (F/C) state where supply of fuel is stopped. In the present embodiment, as in, the case of neutral coasting (described later), the engine 12 is controlled to an idling state where fuel in a minimum amount is supplied.

The free-run coasting unit 54 executes free-run coasting by releasing the clutch C in a state where rotation of the engine 12 is stopped by carrying out fuel cut (F/C) at the time when the accelerator pedal 70 is returned. In this case, the engine braking force becomes smaller than that in the above-described engine braking traveling, and the engine braking force becomes substantially 0 because the clutch C1 is released. Therefore, travel resistance reduces and a travel distance through coasting extends, and, as a result, it is possible to improve fuel economy. The neutral coasting unit 56 executes the neutral coasting by releasing the clutch C1 in a state where rotation of the engine 12 is maintained without carrying out fuel cut (F/C) at the time when the accelerator pedal 70 is returned. In this case as well, the engine braking force becomes smaller than that in the above-described engine braking traveling, and the engine braking force becomes substantially 0 because the clutch C1 is released. Therefore, travel resistance reduces and a travel distance through coasting extends, and, as a result, it is possible to improve fuel economy; however, fuel for keeping the rotation speed of the engine 12 when the accelerator is off is required. The rotation speed NE of the engine 12 during the neutral coasting, that is, when the accelerator pedal is returned, is, for example, an idle rotation speed of about 700 rpm after warm-up, and is, for example, a rotation speed of about 1200 rpm during warm-up, during charging, or the like.

The coasting determination unit 60 determines that a coasting start condition is satisfied. The coasting start condition is, for example, such that the accelerator pedal 70 has been returned to an original position or a position close to the original position in a relatively high-speed steady travel state where the power transmission path from the engine 12 to the drive wheels 20 is connected by the clutch C1, the gear position of the automatic transmission 16 is set to a forward gear position higher than or equal to a predetermined high-speed-side gear position and the vehicle speed V (km/h) is higher than or equal to a predetermined speed. After that, the coasting determination unit 60, for example, determines whether the type of the coasting is the free-run coasting or the neutral coasting on the basis of the state of the engine 12 and the state of the clutch C1 shown in FIG. 2.

Figure 3:
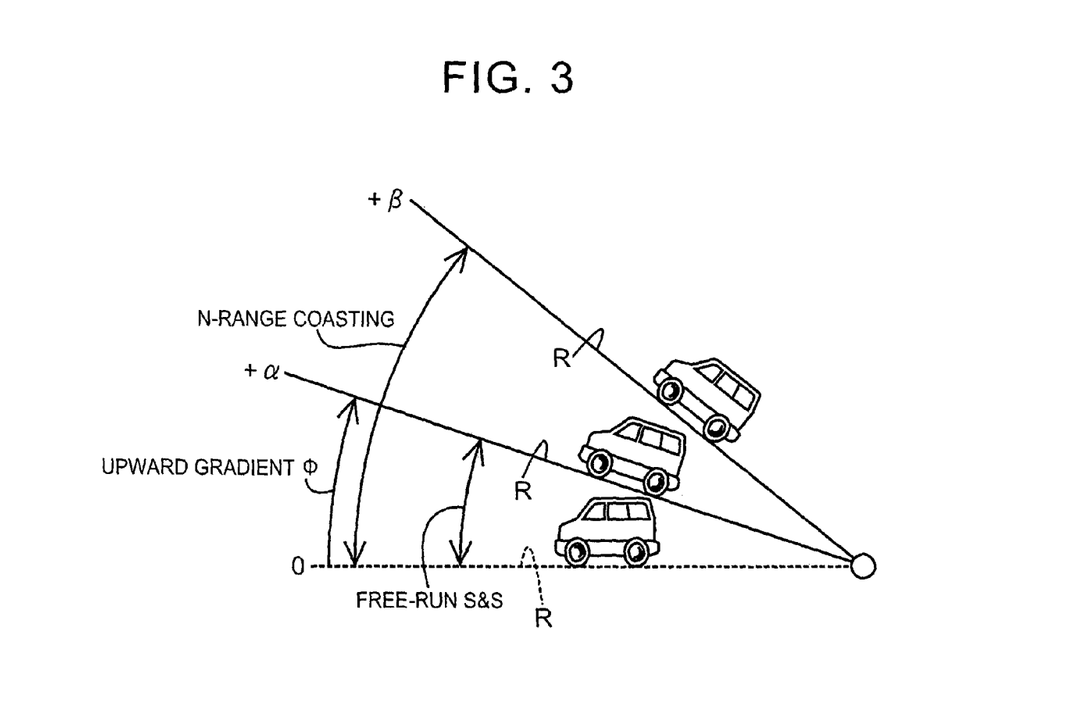
FIG. 3 is a view that illustrates an upward gradient of a road surface.

The upward-gradient determination unit 62 determines whether the upward gradient Φ of the road surface R on which the vehicle is traveling, detected by the road surface gradient sensor 74, is larger than or equal to a preset gradient determination value (free-run coasting upper limit value) α of the upward gradient of the road surface R, and determines whether the upward gradient Φ of the road surface R on which the vehicle is traveling, detected by the road surface gradient sensor 74, is larger than or equal to a preset gradient determination value (neutral coasting upper limit value) β of the upward gradient of the road surface R. The gradient determination value α is, for example, an upper limit value of the upward gradient of the road surface R, which is preset through an experiment, or the like, and at which the free-run coasting is stopped. The gradient determination value β is, for example, an upper limit value of the upward gradient of the road surface R, which is preset through an experiment, or the like, and at which the neutral coasting is stopped. As shown in FIG. 3, the gradient determination value β is set so as to be larger than the gradient determination value α. The upward gradient Φ takes a positive value in upward gradient as shown in FIG. 3, and takes a negative value in downward gradient.

The coasting switching control unit 64, for example, selectively switches into one of the two drive modes, that is, the free-run coasting and the neutral coasting, when the coasting start condition including return operation of the accelerator pedal 70, such as accelerator off operation, is satisfied. When a coasting end condition is satisfied, the coasting till then is ended. In addition, the coasting switching control unit 64 executes the above-described engine braking traveling (normal traveling) when the coasting start condition is not satisfied.

The coasting switching control unit 64 stops the free-run coasting and starts the normal traveling by starting the engine 12 and engaging the clutch C1 when the coasting determination unit 60 determines that the free-run coasting is executed and the upward-gradient determination unit 62 determines that the upward gradient Φ of the road surface R is larger than or equal to the gradient determination value α. When the coasting determination unit 60 determines that the free-run coasting is executed and the upward-gradient determination unit 62 determines that the upward gradient Φ of the road surface R is not larger than or equal to the gradient determination value α, that is, the upward gradient Φ of the road surface R is smaller than the gradient determination value α, the coasting switching control unit 64 continues to execute the free-run coasting.

The coasting switching control unit 64 stops the neutral coasting and starts the normal traveling by engaging the clutch C1 when the coasting determination unit 60 determines that the neutral coasting is executed and the upward-gradient determination unit 62 determines that the upward gradient Φ of the road surface R is larger than or equal to the gradient determination value β. When the coasting determination unit 60 determines that the neutral coasting is executed and the upward-gradient determination unit 62 determines that the upward gradient Φ of the road surface R is not larger than or equal to the gradient determination value β, that is, the upward gradient Φ of the road surface R is smaller than the gradient determination value β, the coasting switching control unit 64 continues to execute the neutral coasting.

Figure 4:
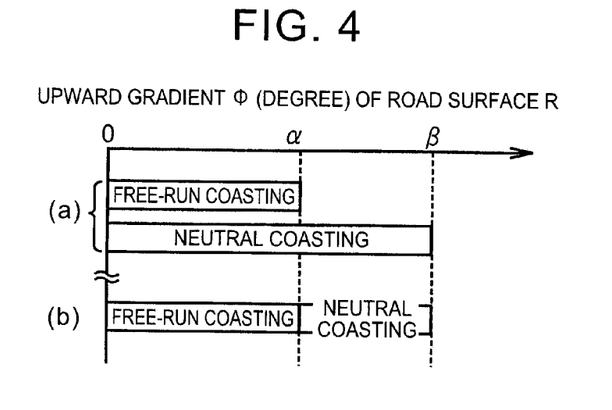
FIG. 4 is a view that illustrates a relationship between neutral coasting and free-run coasting that are stopped on the basis of an upward gradient of a road surface by a coasting switching control unit of the electronic control unit.

In the stop conditions for the free-run coasting and the neutral coasting, relating to the upward gradient Φ, the upper limit value β of the upward gradient Φ of the road surface R, at which the neutral coasting is stopped, is larger than the upper limit value α of the upward gradient Φ of the road surface R, at which the free-run coasting is stopped (α<β) as shown in FIG. 4, for example, a lower limit value (for example, 0) of the upward gradient Φ, at which the free-run coasting is stopped, and a lower limit value (for example, 0) of the upward gradient Φ, at which the neutral coasting is stopped, may be set to the same value as shown in (a) of FIG. 4 or the upper limit value α of the upward gradient Φ, at which the free-run coasting is stopped, and the lower limit value α of the upward gradient Φ, at which the neutral coasting is stopped, may be set to the same value as shown in (b) of FIG. 4.

The coasting switching control unit 64 stops the free-run coasting or the neutral coasting in order to switch into the engine braking traveling or another drive mode, for example, when the coasting determination unit 60 determines that at least one of the determination conditions as to the above-described relatively high-speed steady travel state is not satisfied and/or when brake operation is performed.

Figure 5:
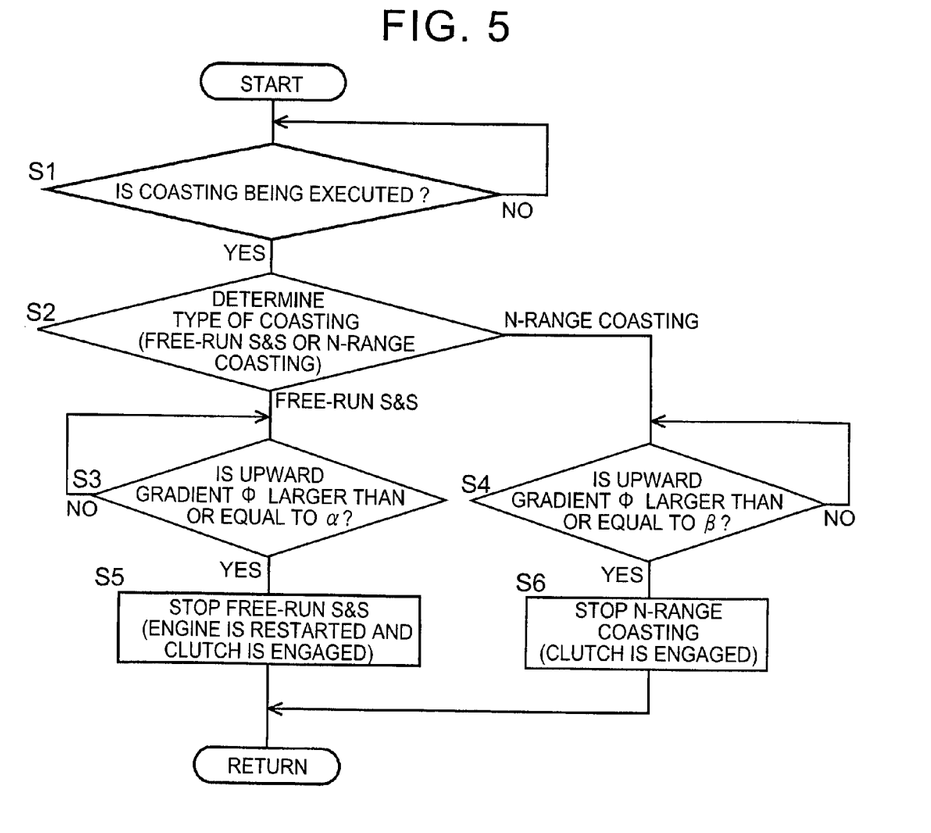
FIG. 5 is a flowchart that illustrates control operations relating to determination as to whether to stop coasting, which are executed by the electronic control unit shown in FIG. 1.
Figure 6:
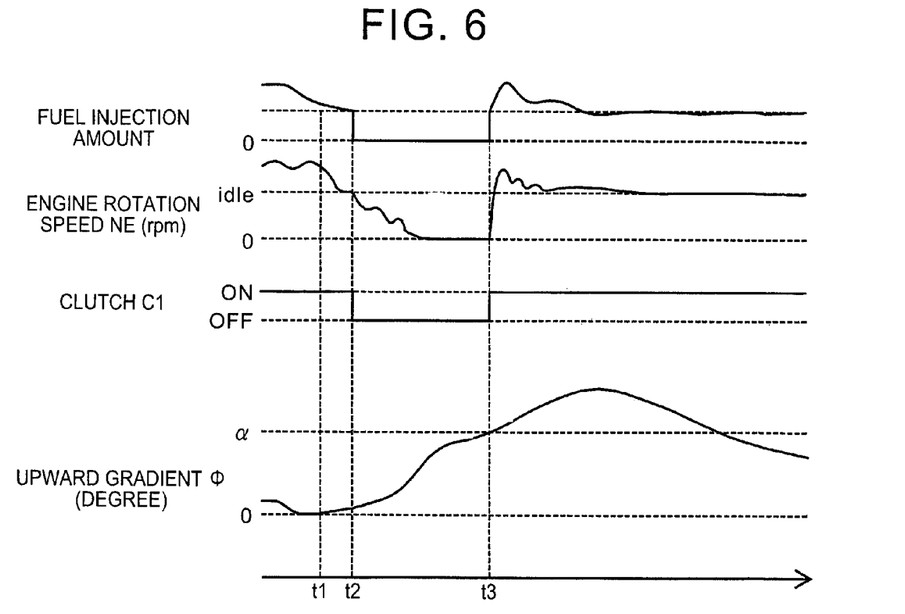
FIG. 6 shows time charts corresponding to the control operations shown in FIG. 5, and shows a case where the free-run coasting is stopped because the upward gradient of the road surface becomes larger than or equal to an upper limit value of the upward gradient of the road surface, at which the free-run coasting is stopped, during the free-run coasting.
Figure 7:
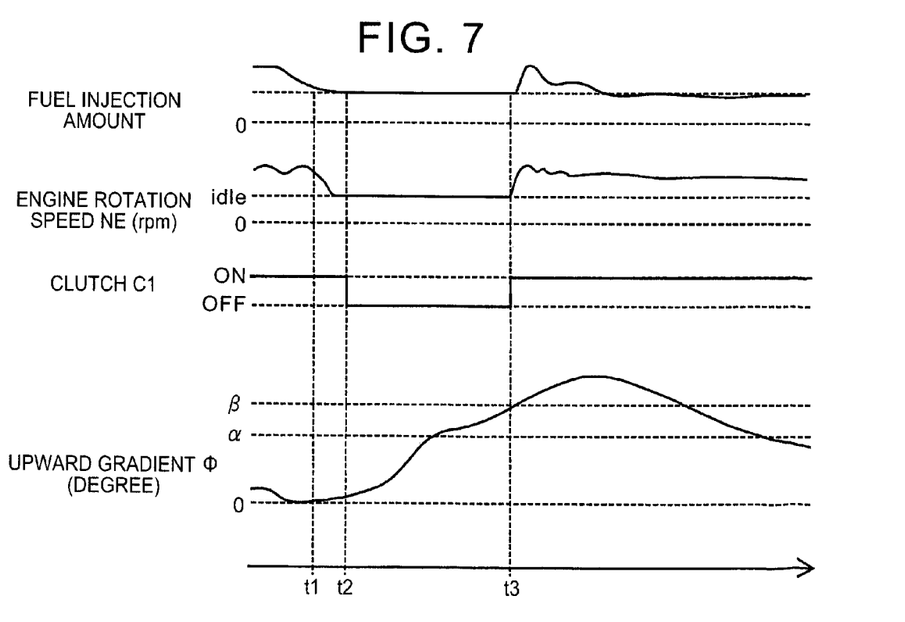
FIG. 7 shows time charts corresponding to the control operations shown in FIG. 5, and shows a case where the neutral coasting is stopped because the upward gradient of the road surface becomes larger than or equal to the upper limit value of the upward gradient of the road surface, at which the neutral coasting is stopped, during the neutral coasting.

FIG. 5 is a flowchart that illustrates a relevant portion of control operations of the electronic control unit 50, that is, control operations for determining to stop the free-run coasting or the neutral coasting by the coasting switching control unit 64 on the basis of the determination made by the upward-gradient determination unit 62, stopping the coasting determined to be stopped and starting the normal traveling. FIG. 6 shows time charts corresponding to the relevant portion of the control operations of the electronic control unit 50 shown in FIG. 5, and shows a case where the free-run coasting is stopped when the upward gradient Φ becomes larger than or equal to the gradient determination value α during the free-run coasting. FIG. 7 shows time charts corresponding to the relevant portion of the control operations of the electronic control unit 50 shown in FIG. 5, and shows a case where the neutral coasting is stopped when the upward gradient Φ becomes larger than or equal to the gradient determination value β during the neutral coasting.

In FIG. 5, in step S1 (hereinafter, step is omitted) corresponding to the coasting determination unit 60, it is determined whether the coasting start condition is satisfied, that is, whether the coasting (the free-run coasting or the neutral coasting) is being executed. When negative determination is made in S1, S1 is repeatedly executed. For example, when the depression of the accelerator pedal 70 is released in the relatively high-speed steady travel state at t1 timing in FIG. 6 and t1 timing in FIG. 7 and the coasting is started at t2 timing in. FIGS. 6 and t2 timing in FIG. 7, affirmative determination is made in S1, and S2 corresponding to the coasting determination unit 60 is executed.

In S2, it is determined whether the type of the coasting being executed is the free-run coasting or the neutral coasting. When it is determined in S2 that the free-run coasting (free-run S&S) where the clutch C1 is released and fuel injection is stopped is being executed, for example, as in the case between t2 and t3 in FIG. 6, S3 corresponding to the upward-gradient determination unit 62 is executed. When it is determined in S2 that the neutral coasting (N range coasting) where the clutch C1 is released and the engine 12 is in operated at an idle is being executed, for example, as in the case between t2 and t3 in FIG. 7, S4 corresponding to the upward-gradient determination unit 62 is executed.

In S3, it is determined whether the upward gradient Φ is larger than or equal to the gradient determination value α.

When negative determination is made in S3, S3 is repeatedly executed. For example, when the upward gradient Φ becomes larger than or equal to the gradient determination value α at t3 timing in FIG. 6 and affirmative determination is made in S3, S5 corresponding to the coasting switching control unit 64 is executed. In S5, the free-run coasting is stopped by engaging the clutch C1 and starting fuel injection as shown at t3 timing in FIG. 6, and, for example, the neutral coasting or the normal traveling is started.

In S4, it is determined whether the upward gradient Φ is larger than or equal to the gradient determination value β. When negative determination is made in S4, S4 is repeatedly executed. For example, when the upward gradient Φ becomes larger than or equal to the gradient determination value β at t3 timing in FIG. 7 and affirmative determination is made in S4, S6 corresponding to the coasting switching control unit 64 is executed. In S6, the neutral coasting is stopped by engaging the clutch C1 as shown at t3 timing in FIG. 7 and, for example, the normal traveling is started.

As described above, with the electronic control unit 50 included in the vehicle drive device 10 according to the present embodiment, the gradient determination value β of the upward gradient of the road surface R, at which the neutral coasting is stopped, is set so as to be larger than the gradient determination value α of the upward gradient of the road surface R, at which the free-run coasting is stopped. Therefore, the coasting switching control unit 64 including the upward-gradient determination unit 62 executes the neutral coasting at a place where the upward gradient Φ of the road surface R is larger than or equal to the gradient determination value α and the need for re-acceleration at the time of returning from coasting is large, the response of re-acceleration at the time of the returning improves. At a place where the upward gradient Φ of the road surface R is smaller than the gradient determination value α, the free-run coasting is allowed to be executed, so it is possible to execute the coasting having high fuel economy. Thus, it is possible to achieve both improvement in the fuel economy of the vehicle and improvement in the response of re-acceleration of the vehicle when the vehicle coasts on an upward-gradient road surface R.

With the electronic control unit 50 included in the vehicle drive device 10 according to the present embodiment, the coasting switching control unit 64 including the upward-gradient, determination unit 62 stops the free-run coasting and starts the normal traveling when the upward-gradient determination unit 62 determines that the upward gradient Φ is larger than or equal to the gradient determination value α during the free-run coasting, and stops the neutral coasting and starts the normal traveling when the upward-gradient determination unit 62 determines that the upward gradient Φ is larger than or equal to the gradient determination value β during the neutral coasting. Thus, the response of re-acceleration when the vehicle coasts on an upward-gradient road surface R favorably improves.

The embodiment of the invention is described in detail above with reference to the accompanying drawings; however, the invention is also applied to other alternative embodiments.

In the present embodiment, the upward gradient Φ is obtained from the road surface gradient sensor 74, such as a G sensor that detects a longitudinal acceleration; however, means for acquiring information about the upward gradient Φ is not limited to the road surface gradient sensor 74. For example, the upward gradient Φ may be obtained on the basis of an actual driving force of the engine 12 or a throttle valve opening degree and a vehicle speed by consulting a prestored relationship between the driving force of the engine 12 or throttle opening degree and the vehicle speed on a flat road. Alternatively, the upward gradient Φ may be obtained on the basis of, an actual point from prestored map information, or the like.

In the present embodiment, in the coasting switching control unit 64, the stop conditions for the types of coastings (the free-run coasting and the neutral coasting) are set by taking into consideration the upward gradient Φ of the road surface R with the use of the upward-gradient determination unit 62; instead, for example, an accelerator depression amount, a brake depression amount, a steering angle, a shift lever operation, a vehicle speed, a distance to a vehicle ahead, or the like, illustrated in JP 2002-227885 A, may also be included in the stop conditions.

In the present embodiment, the gradient determination values α, β are predetermined constant values; instead, the gradient determination values α, β each may be a function of a vehicle state, such as a battery remaining level, an engine coolant temperature and the need for hydraulic pressure, and may be variably set in consideration of those vehicle states. These variable settings may be such that the gradient determination values α, β are continuously varied or may be varied in a stepwise manner including two steps, and are determined in form of a data map, an arithmetic expression, or the like, in advance. The above function may be, for example, set such that the gradient determination values α, β reduce with a decrease in the battery remaining level, a decrease in the engine coolant temperature or an increase in the need for hydraulic pressure.

In the present embodiment, the free-run coasting is stopped and the normal traveling is started when the upward-gradient determination unit 62 determines that the upward gradient Φ is larger than or equal to the gradient determination value α during the free-run coasting, and the neutral coasting is stopped and the normal traveling is started when the upward-gradient determination unit 62 determines that the upward gradient Φ is larger than or equal to the gradient determination value β during the neutral coasting. Instead, for example, the free-run coasting may be stopped and the neutral coasting may be started when the upward-gradient determination unit 62 determines that the upward gradient Φ is larger than or equal to the gradient determination value α during the free-run coasting. With this configuration, for example, in comparison with the above-described embodiment in which the free-run coasting is stopped and the normal traveling is started when the upward gradient Φ is larger than or equal to the gradient determination value α, the neutral coasting is executed and the power transmission path between the engine 12 and the drive wheels 20 is disconnected within a range in which the upward gradient Φ is larger than or equal to the gradient determination value α and is smaller than the gradient determination value β, so the fuel economy of the vehicle when the vehicle coasts on an upward-gradient road surface R improves.

In the electronic control unit 50 according to the present embodiment, any one of the neutral coasting and the free-run coasting is allowed to be executed when the upward gradient Φ is smaller than the gradient determination value α (Φ<α); instead, for example, the electronic control unit 50 may execute control such that the free-run coasting is selected when the upward gradient Φ is smaller than the gradient determination value α. With this configuration, at a place where the upward gradient Φ is relatively small and there is a low likelihood of re-acceleration, that is, at a place where the upward gradient Φ is smaller than the gradient determination value α, the free-run coasting is selected, so it is possible to execute the coasting having high fuel economy.

In the present embodiment, the clutch device is configured as the hydraulic clutch C1 provided in series with the power transmission path; instead, various types of clutches, such as a clutch device that is, for example, able to connect or disconnect the power transmission path by electrically controlling reaction force, may be employed.

In the present embodiment, a non-start condition or the stop condition for the free-run coasting is configured such that the free-run coasting is switched into the engine braking traveling or another drive mode when at least one of the determination conditions as to the relatively high-speed steady travel state is not satisfied and/or when brake operation is performed; instead, a condition that warm-up is required because the engine coolant temperature is lower than or equal to a predetermined temperature, a condition that negative pressure that is generated in the intake pipe of the engine is required; a condition that supply of hydraulic pressure to hydraulically controlled devices, such as the hydraulic friction engagement devices, is required, or a condition that charging of a battery by an alternator provided at the engine is required may be set as an independent condition. This is because warm-up, generation of negative pressure or battery charging is carried out by preferentially switching into the neutral coasting, the engine braking traveling, or the like, in which the engine is rotated.

In the present embodiment, the start condition for the neutral coasting is configured such that the accelerator pedal 70 has been returned to the original position or a position close to the original position in the relatively high-speed steady travel state where the power transmission path from the engine 12 to the drive wheels 20 is connected by the clutch C1, the gear position of the automatic transmission 16 is set to a forward gear position higher than or equal to a predetermined high-speed-side gear position and the vehicle speed V (km/h) is higher than or equal to a predetermined speed; additionally, a condition that the gear position is an N range may be set as the start condition.

The above embodiment is only illustrative. The invention may be modified or improved in various forms on the basis of the knowledge of persons skilled in the art.

The invention claimed is:

1. A drive control device for a vehicle including an engine and a clutch device provided in a power transmission path between the engine and a drive wheel, comprising: a normal traveling unit configured to execute normal traveling in which the vehicle travels in a state where the engine is connected to the drive wheel;
a free-run coasting unit configured to execute free-run coasting in which the engine is disconnected from the drive wheel by the clutch device during traveling and the vehicle coasts while the engine is stopped;
a neutral coasting unit configured to execute neutral coasting in which the engine is disconnected from the drive wheel by the clutch device during traveling and the vehicle coasts while the engine is autonomously operated; and
a coasting switching control unit configured to set an upper limit value of an upward gradient of a road surface, at which the neutral coasting is stopped, such that the upper limit value of the upward gradient of the road surface at which the neutral coasting is stopped is larger than an upper limit value of the upward gradient of the road surface at which the free-run coasting is stopped.

2. The drive control device according to claim 1, wherein the coasting switching control unit is configured to stop the free-run coasting and to start the normal traveling when the upward gradient of the road surface becomes larger than the upper limit value of the upward gradient of the road surface, at which the free-run coasting is stopped, during the free-run coasting, and
the coasting switching control unit is configured to stop the neutral coasting and to start the normal traveling when the upward gradient of the road surface becomes larger than the upper limit value of the upward gradient of the road surface, at which the neutral coasting is stopped, during the neutral coasting.

3. The drive control device according to claim 1, wherein the coasting switching control unit is configured to stop the free-run coasting and to start the neutral coasting when the upward gradient of the road surface becomes larger than the upper limit value of the upward gradient of the road surface, at which the free-run coasting is stopped, during the free-run coasting, and
the coasting switching control unit is configured to stop the neutral coasting and to start the normal traveling when the upward gradient of the road surface becomes larger than the upper limit value of the upward gradient of the road surface, at which the neutral coasting is stopped, during the neutral coasting.

4. The drive control device according to claim 1, wherein the coasting switching control unit is configured to select the free-run coasting when the upward gradient of the road surface is smaller than the upper limit value of the upward gradient of the road surface, at which the free-run coasting is stopped.

* * * * *